United States Patent Office 3,341,606
Patented Sept. 12, 1967

3,341,606
PROCESS FOR PRODUCING VINYL ETHERS
Henry O. Mottern, Far Hills, N.J., assignor, by mesne assignments, to Air Reduction Company, Incorporated, New York, N.Y., a corporation of New York
No Drawing. Filed Oct. 22, 1965, Ser. No. 502,342
6 Claims. (Cl. 260—614)

This invention relates to a novel process for preparing vinyl ethers.

Vinyl ethers are useful compounds which have found application as intermediates and as monomers to prepare homopolymers and copolymers for adhesive, film-forming and coating compositions and for fabrication of various decorative or structural elements. The usual commercial method for preparing vinyl ethers is by the vinylation of alcohols with acetylene. This process, is heretofore practiced, requires that gaseous acetylene be metered into the reactor. The storing, handling and metering of a gaseous reactant is often inconvenient and difficult. Because of the chemical nature of acetylene, it is generally not stored for prolonged periods but is prepared immediately prior to its use in the reaction, typically by reacting calcium carbide and water. This technique requires an additional step in the process with attendant increases in manpower, equipment, etc.

It is accordingly an object of this invention to provide a process for making vinyl ethers which does not require the handling of gaseous acetylene.

It has been discovered that in accordance with this invention that vinyl ethers can be prepared by the direct reaction of calcium carbide with an alcohol. The vinyl ether of the alcohol is readily recovered.

The process of this invention possesses many advantages over prior art methods. The reactants are solids or liquids which are more conveniently stored, handled, and measured, and by-products from the reaction are capable of recycling for re-use in the process.

Preferably, the calcium carbide is used in the form of a fine powder. Most preferably, it will have an average particle size suitable for forming a fluidized bed. Average particle sizes of about 20 to 200 mesh are generally satisfactory. If the calcium carbide is not available in the desired particle size, it can be ground under an inert atmosphere.

The process of this invention provides a convenient and satisfactory technique for preparing vinyl ethers from monohydric alkyl, aryl or alkenyl alcohols. The alkyl, aryl and alkenyl groups present in the alcohols may be inertly substituted, i.e. may bear substituents which do not react with any of the reaction components or reaction products under the conditions employed. Typical inert substituents include alkyl, aryl, alkenyl, and ether. Illustrative alkyl alcohols include methanol, ethanol, n-propanol, isopropanol, n-butanol, sec-butanol, hexanol, octanol, decanol, dodecanol, octadecanol, 2-ethoxy, 2-ethylhexanol, benzyl alcohol, β-phenylethanol, cyclohexanol, 4-methylcyclohexanol, etc. Illustrative aryl alcohols include phenol, p-cresol, etc. Illustrative alkenyl alcohols include allyl alcohol. The preferred alcohols are the lower alkanols, i.e. alkyl alcohols containing less than about 8 carbon atoms, and most preferably methanol. Preferably, the alcohol will be anhydrous to avoid unnecessary losses of calcium carbide and generation of acetylene.

It is believed that the reaction between the the alcohol and the calcium carbide proceeds according to the following equation, wherein R is alkyl, aryl or alkenyl:

$$3ROH + CaC_2 \rightarrow Ca(OR)_2 + CH{=}CHOR$$

The vinyl ether can be recovered by distilling or filtering it from the by-product calcium alcoholate. Where R is a lower alkyl, such as methyl or ethyl, the calcium alcoholate has sufficient stability to be isolated from the reaction. In such cases, the calcium alcoholate can be recovered and decomposed with water, steam or water vapor to regenerate the alcohol, which can be recycled. The calcium is converted to the form of calcium oxide or hydroxide which can be reacted with carbon to produce calcium carbide and thereby recycled.

Where R is other than methyl or ethyl, the calcium alcoholate formed in the reaction may decompose at the temperature employed to give calcium oxide and a higher alcohol which is formed by condensing two or more moles of the alcohol of the calcium alcoholate. For example, the reaction wherein the calcium alcoholate is calcium isopropylate may be represented as $$Ca[OCH(CH_3)_2]_2 \rightarrow CaO + (CH_3)_2CHCH_2CH(OH)CH_3$$

or $$3Ca[OCH(CH_3)_2]_2 \rightarrow 3CaO + 2(CH_3)_2CHCH_2CH(CH_3)CH_2CH(OH)CH_3 + H_2O$$

The calcium oxide so-produced can be recycled and converted back to calcium carbide. The higher alcohols can be separated from the product and used as solvents, intermediates, etc.

The process of this invention can be adapted to batch or continuous operation. The calcium carbide can be dispersed in the alcohol to be vinylated and the so-formed dispersion can be heated in a batch-type reactor or a continuous tubular reactor. Alternatively, the calcium carbide can be provided in the form of fixed or fluidized bed, alone or with a carrier or diluent, and the alcohol to be vinylated can be passed through the bed as a liquid or in the vapor phase.

When the reaction is run in the liquid phase as a batch-type process, the alcohol to be vinylated and the calcium carbide can be mixed together in the ratio of about 5 to 1 moles of alcohol per mole of calcium carbide. Preferably, about 2 to 1 moles of alcohol is employed per mole of calcium carbide. The reaction temperature can be between about 70° C. and 150° C. and preferably between 100° C. and 125° C. Satisfactory yields can be obtained at atmospheric pressure but higher pressures are preferred because they permit the reaction to be run in the liquid phase at higher temperatures. Pressures of about 100 to 600 p.s.i. are sutiable. The reactants are held at the desired temperature and pressure for about 4–80 hours to complete the reaction. The pressure is then released and the product vinyl ether is recovered.

When calcium carbide is employed in the form of a bed, e.g. a fluidized bed, and the alcohol to be vinylated is passed therethrough as a liquid or as a vapor, the reaction will generally be carried out at a pressure of about 15 to 200 p.s.i., preferably 200 to 400 p.s.i. and a temperature between about 75° C. to 350° C., preferably 125° C. to 150° C. The ratio of calcium carbide to alcohol will depend upon the total amount of calcium carbide in the bed and the total amount of alcohol passed therethrough. The vapor velocity and residence time will vary depending upon the system employed, but preferably they will be adjusted to maintain the bed in a fluidized state. Velocities of about .7 to 2.0 feet per second and space velocity of about 1.0–3.0 vol. gas/vol. bed/min. are generally suitable.

The effluent vapor or liquid can be fractionally condensed or distilled to separate the product vinyl ether and any acetylene formed. When substantially all of the calcium carbide has reacted, the resulting mass can be removed, steam-stripped and calcined if necessary, and the calcium oxide returned for reconversion to calcium carbide in conventional manner.

The following examples are provided to further illustrate the invention and to set forth the manner in which it is now preferred to practice this invention. It will be understood, however, that the invention is not limited to the specific embodiments described. Many variations will occur to those skilled in the art or will be obvious from the description given herein and many variations can be made without departing from the scope of this invention. The invention is not to be limited except as defined in the appended claims.

EXAMPLE 1

50 grams of 69.4% calcium carbide (0.54 mole) is placed in an autoclave together with 200 cc. (2.63 moles) of isopropanol. The reaction mixture is stirred and the temperature is gradually increased from 24° C. to 219° C. over a period of 6⅔ hours. The autoclave is then cooled to 24° C. and the vapors are bled off. Distillation of the alcoholic residue gives 49 cc. of vinyl isopropyl ether—isopropanol azeotrope, which is equivalent to .403 mole of the vinyl ether. Including ether in the gas collected, the yield is 76.5% of theory, based on calcium carbide. Small quantities of acetylene, 2-methyl-4-pentanol and 2,4-dimethyl-6-heptanol are recovered.

EXAMPLE 2

Following the general procedure of Example 1, 5.21 moles of methanol are reacted with 2.17 moles of calcium carbide over a period of 72 hours at 120–125° C. and 600–915 p.s.i. to give methyl vinyl ether.

EXAMPLE 3

Following the general procedure of Example 1, 6.87 moles of ethanol are reacted with 1.084 moles of calcium carbide over a period of about 6.5 hours at 205° C. and 450–660 p.s.i. to give vinyl ethyl ether in 15.4% yield based on calcium carbide.

It will be apparent to those skilled in the art that various changes and modifications may be made in the embodiments described above without departing from the invention, as defined in the appended claims. It is intended, therefore, that all matter contained in the foregoing description shall be interpreted as illustrative only and not as limitative of the invention.

I claim:

1. The process for preparing vinyl ethers which consists of reacting calcium carbide with an alkanol containing up to 18 carbon atoms at a temperature between about 70° C. and 350° C. thereby forming the vinyl ether of said alcohol, and recovering said vinyl ether.

2. The process of claim 1, wherein said alcohol is a lower alkyl alcohol.

3. The process of claim 1, wherein said alcohol is isopropanol.

4. The process of claim 1, wherein said alcohol is methanol.

5. The process of claim 1, wherein said alcohol is ethanol.

6. The process of claim 1, wherein the reaction is carried out at a temperature between about 70° C. and 150° C.

References Cited

FOREIGN PATENTS 163,608  8/1964  U.S.S.R.

LEON ZITVER, *Primary Examiner.*

H. T. MARS, *Assistant Examiner.*